United States Patent [19]

Orii et al.

[11] 4,276,581

[45] Jun. 30, 1981

[54] HEADLIGHT TILTING SYSTEM FOR VEHICLES

[75] Inventors: Shinichi Orii, Fujisawa; Masao Ishikawa, Yokohama, both of Japan

[73] Assignee: Nissan Motor Company, Limited, Yokohama, Japan

[21] Appl. No.: 22,030

[22] Filed: Mar. 20, 1979

[30] Foreign Application Priority Data

Mar. 22, 1978 [JP] Japan .................. 53-36494[U]

[51] Int. Cl.³ .............................................. B60Q 1/06
[52] U.S. Cl. ...................................... 362/40; 362/43; 362/66; 362/71
[58] Field of Search ............... 362/37, 40, 43, 44, 362/66, 67, 71

[56] References Cited

U.S. PATENT DOCUMENTS

| | | | |
|---|---|---|---|
| 3,207,891 | 9/1965 | Eberle | 362/71 |
| 4,110,819 | 8/1978 | Ishakawa | 362/66 |
| 4,141,063 | 2/1979 | Kumagai et al. | 362/40 |
| 4,142,228 | 2/1979 | Kumagai et al. | 362/66 |
| 4,225,902 | 9/1980 | Ishikawa et al. | 362/40 |

FOREIGN PATENT DOCUMENTS

| | | | |
|---|---|---|---|
| 2449155 | 4/1972 | Fed. Rep. of Germany | 362/40 |
| 2055641 | 5/1972 | Fed. Rep. of Germany | 362/40 |
| 2637326 | 3/1977 | Fed. Rep. of Germany | 362/40 |
| 2742487 | 3/1978 | Fed. Rep. of Germany | 362/37 |
| 2715125 | 10/1978 | Fed. Rep. of Germany | 362/66 |
| 2804394 | 8/1979 | Fed. Rep. of Germany | 362/37 |
| 395241 | 7/1933 | United Kingdom . | |
| 835775 | 5/1960 | United Kingdom . | |
| 1110742 | 4/1968 | United Kingdom . | |
| 1287808 | 9/1972 | United Kingdom . | |
| 1295185 | 11/1972 | United Kingdom . | |
| 1487265 | 9/1977 | United Kingdom . | |

Primary Examiner—Teddy S. Gron
Attorney, Agent, or Firm—Schwartz, Jeffery, Schwaab, Mack, Blumenthal & Koch

[57] ABSTRACT

This invention relates to a headlight tilting system for vehicles having pivotal frames, oscillatable via a linkage driven by an electric motor and circuitry in which a manual switch can be set to establish a circuit between the motor and a battery via contacts sliding on a first conductive portion of a rotatable member driven by the motor. Electric current flows to the motor until a second portion electrically isolated or portions reaches one of the contacts forming the circuit when the circuit is broken and a switching arrangement simultaneously short circuits the armature of the motor to stop rotation of the motor instantly thus stopping the oscillation of the frames in exactly the desired position.

9 Claims, 8 Drawing Figures

HEADLIGHT TILTING SYSTEM FOR VEHICLES

BACKGROUND OF THE INVENTION

The present invention relates generally to headlight tilting system and more particularly to circuitry for such a system which permits accurate and error free selection of the desired angle of the headlight beams.

It has already been proposed to mount a headlight or headlights of an automobile on a frame which is pivotally mounted to the front of the vehicle and control the pivoting of the frames via a push pull cable controlled manually by the driver. This kind of control involves knobs and/or levers movable by the driver. However such arrangements tend to require excessive attention to achieve a desired setting of the headlights which distracts the driver from the all important task of controlling the vehicle.

Another arrangement utilizes a double ended mercury switch which, when not horizontal connects a source of E.M.F. (electromotive force) with an electric motor which operates to return the switch to its horizontal position. The headlight frame is suitably connected to the switch and the electric motor so that upon the longitudinal axis of the vehicle being angled with respect the surface of the road via loading of a heavy weight in the trunk or the like, the mercury switch is triggered to vary the angle of the headlight accordingly.

However such an arrangement has lacked control by the driver especially when travelling up and down hills steep enough to cause the mercury to run to the front or rear of the mercury switch whereby tilting of the headlight beams occurs irrespective of the inclination of the vehicle with respect to the surface of the road.

A third arrangement has been proposed wherein an easily operatable switch is provided for the drivers quick and ready use which energizes an electric motor which moves the headlight mounting frames. This system includes a rotatable electrically conductive member and a series of contacts in sliding contact therewith which combine to effect selection of the position of the headlight mounting frames. However this arrangement has suffered from the drawback that, due to the inertia of the motor armature, the rotatable member is apt to overrun to reconnect the motor with the source of electromotive force. Undesirable disconcerting cyclic repetition of the selection operation is thus apt to occur.

This third arrangement while having solved in part the drawbacks encountered by the first and second mentioned prior art arrangements has lacked precise and mistake free operation. Further mention of this arrangement will be made later in this disclosure under the heading of "detailed description of the invention".

SUMMARY OF THE INVENTION

It is an object of the present invention to provide a headlight tilting system for an automotive vehicle which provides accurate and error free selection of headlight beam angle.

It is a further object of the present invention to provide a headlight tilting system for an automotive vehicle which can be manufactured with normal mass production tolerances and still provided said accurate and error free selection of the headlight beam angle.

A further object of the present invention is to provide a headlight tilting system which includes relatively simple circuitry which does not increase the weight or complexity of the system unduly.

In summary the present invention contemplates to, through the use of circuitry having a rotary contact having a non-conductive portion or portions and a series of sliding contacts which are arranged to sequencially come into contact with the non conductive portion or portions, break a circuit, established through one of the contacts, between a source of electromotive force (such as the vehicle battery) and an electric motor which through its rotation induces cyclic oscillation of the headlight mounting frames, and simultaneously short the coil or coils of the armature of the electric motor to induce a counter electromagnetic force therein which resists the rotation of the armature. This enables the stopping of the cyclic oscillation of the headlight mounting frame at exactly a preselected position and eliminates the overrun characteristics of the prior art wherein the armature is not subjected to any braking force and which tends to continue to rotate under the influence of inertia.

BRIEF DESCRIPTION OF THE DRAWINGS

The above described objects and features will become more clearly understood as the discription of the preferred embodiments proceeds taken with the accompanying drawings in which.

DETAILED DESCRIPTION OF THE INVENTION

Before proceeding with a detailed description of the embodiments of the present invention it is deemed necessary for a complete and deep understanding thereof to firstly consider the third prior art arrangement briefly described in the earlier part of this specification. This will be done with the aid of FIGS. 1 and 2 of the drawings.

Figure 1:
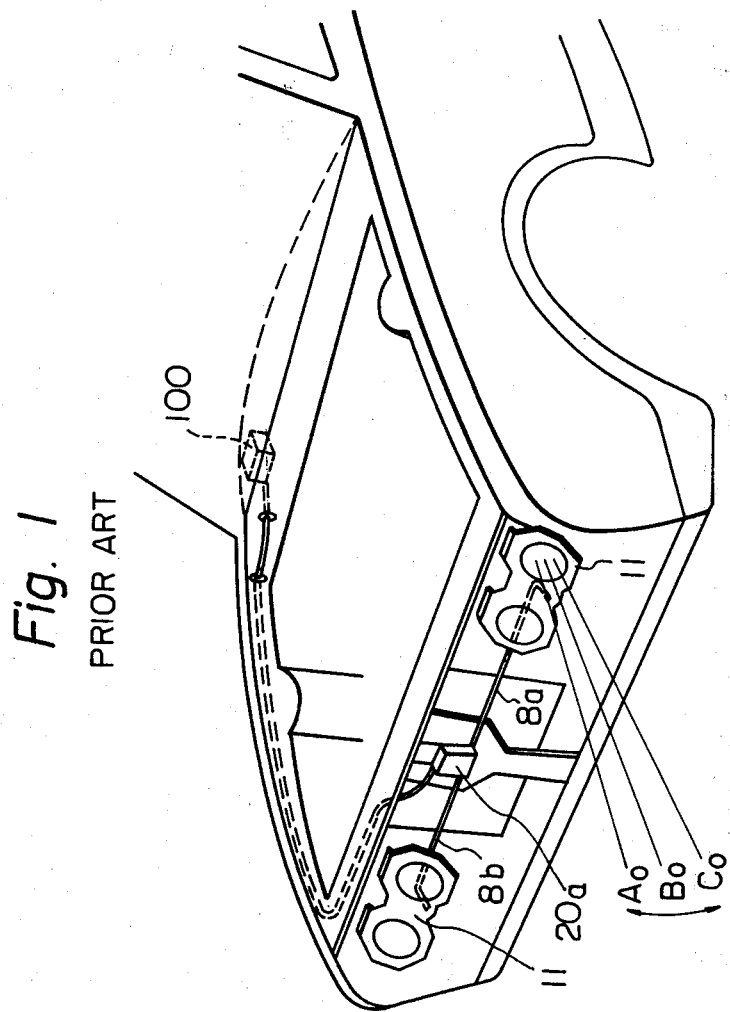
FIG. 1 is a schematic view of a motor vehicle equipped with a headlight system according to the prior art.
Figure 2:
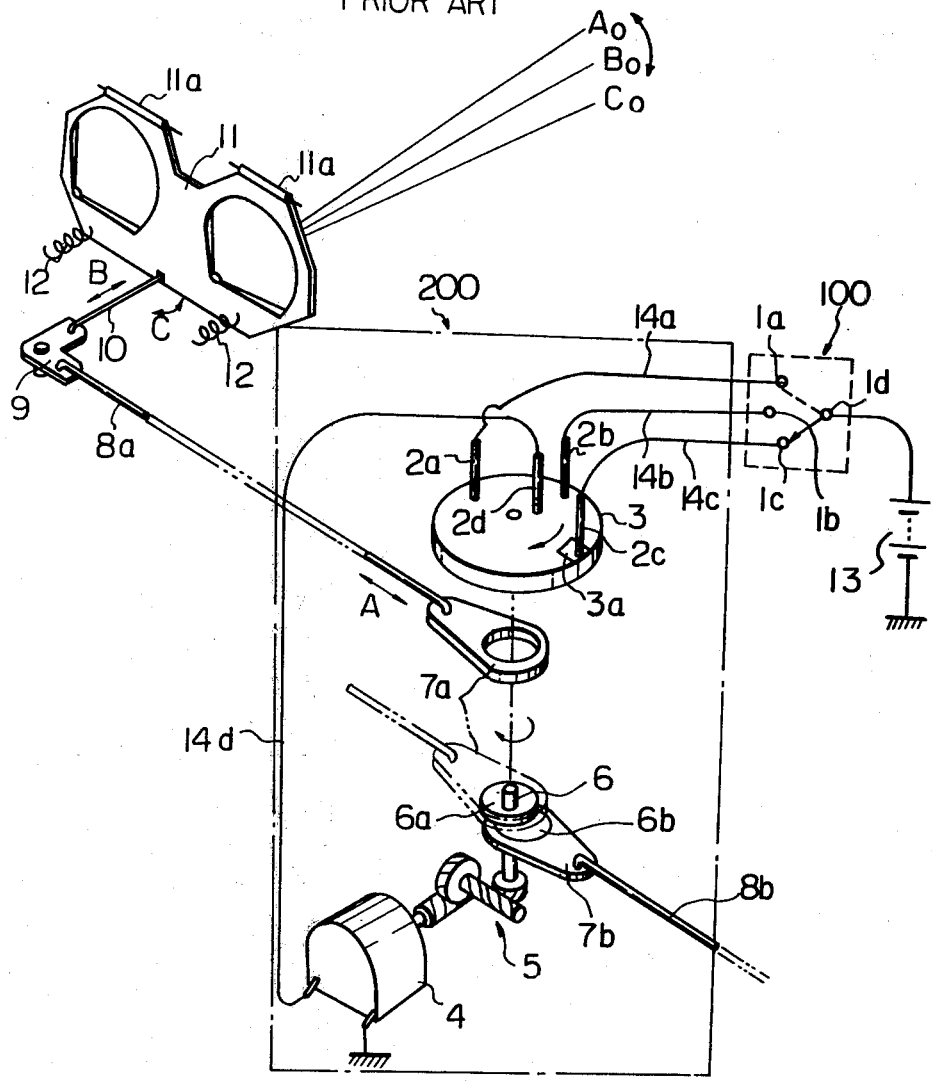
FIG. 2 is a schematic and partially exploded view of the circuitry and construction of the prior art control device of the headlight tilting system illustrated in FIG. 1.

In FIGS. 1 and 2 the numeral 100 denotes a control switch located within easy reach of the driver. This switch may take the form of push button switch or any other ergonomical arrangement enabling ready and effortless selection of a desired headlight beam angle. A control cable, no numeral, leads from the switch 100 to a housing 200 in which an electric motor 4, reduction gear 5, rotary eccentric cams 6a, 6b carried on a rotary shaft 6 driven by said motor 4 through the reduction gear 5, a rotary electrically conductive disc 3 and sliding contacts 2a, 2b, 2c and 2d are housed. Also within the housing 200 are two cam followers 7a and 7b in sliding connection with the eccentric cams 6a and 6b respectively. Two rods 8a and 8b are pivotally connected at their respective ends to the cam followers 7a and 7b and lead to two bell-crank levers 9 (only one is shown). Rods 10 (only one shown) interconnect the headlight mounting frames 11 to the bell crank levers. As shown the headlight mounting frames 11 are biased in one rotational direction by springs 12, and are pivoted on hinges 11a.

Referring now specifically to FIG. 2, the rotary electrically conductive disc 3 is formed with a nonconductive portion in the form of a cut out portion or recess 3a. As shown the sliding contact 2d is positioned near the axis of rotation of the disc 3 so as not to come into contact with the just mentioned recess 3a. On the other had the remaining contacts 2a to 2c are arranged near the perimeter of the disc so as to be one by one or sequencially exposed to the recess.

A source of electromotive force which in this case takes the form of a battery 13 is connected to the driver operatable switch 100. This switch is illustrated to have a movable contact 1d selectively engageable with three stationary contacts 1a, 1b and 1c. It is to be noted that in this case as well as in the embodiments of the invention that the number of stationary contacts is a matter of choice and will correspond to the number of different positions it is desired to be able to move the headlight mounting frames into. For the purpose of explanation only three contacts have been illustrated. The stationary contacts 1a to 1c are respectively connected via leads 14a to 14c to the sliding contacts 2a to 2c. The sliding contact 2d is connected via lead 14d to one terminal of the electric motor 4 the other of which is connected to ground (or earth).

Thus with the just described arrangement when it is desired to adjust the angle of the headlight beams with respect to the vehicle, the movable contact 1d is moved to the appropriated stationary contact to energize the electric motor. For explanation lets assume that stationary contact 1b is selected by the driver. This will allow current to flow to the sliding contact 2b which will be assumed to be in the position illustrated in FIG. 2. Thus current will flow from the sliding contact 2b to the sliding contact 2d through the conductive disc 3. Current will thus pass through the motor 4 inducing rotation of the rotary shaft through the reduction gear generally indicated by 5. As the disc 3 is fixedly connected to the shaft 6 it too will undergo rotation. The recess 3a will thus be moved through approximately a 270 degree angle to justapose the contact 2b. During this rotation of the disc the eccentric cams 6a and 6b will have caused the cam followers 7a and 7b to have moved the headlight mounting frames so that they now direct the optical axes of the headlight beams along axis $B_o$ for example. This of course is achieved through the afore described rod and bell crank linkage.

Now upon the sliding contact 2b being exposed to the recess 3a current will no longer pass from the battery 13 to the sliding contact 2d through the conductive disc 3. The motor 4 will thus be deenergized. However the armature of the motor 4 has a certain mass and will undergo further rotation under the influence of its own inertia. This additional rotation is often sufficient to rotate the disc 3 far enough to bring the disc back into contact with the selected sliding contact, in this case 2b. Current will flow from the battery to the electric motor 4 inducing the headlight mounting frames 11 to oscillate, moving the headlight beam axes to align with axis Co, then Ao and back to Bo. Upon reaching its original position, wherein contact 2b is exposed to the recess 3a the same phenomenon is likely to occur. Highly disconcerting operation of the headlight tilting system can thus be expected.

It has been found difficult to increase the size of the recess and simultaneously maintain the overall diameter of the disc 3 within reasonable limits and provide a sufficiently large contact surface for each of the sliding contacts, especially so in the case a large electric motor is used and the inertia of the armature is correspondingly high.

Hence according to the present invention it is proposed that upon the selected sliding contact being exposed to the recess or the equivalent the armature coil or coils of the electric motor is short circuited inducing a braking effect which stops the rotation of the armature, due to inertia, instantly.

Advantageously the invention utilizes all of the basic components of the just described prior art such as the driver operatable switch 100, motor 4, reduction gear 5 rotary shaft 6, cams 6a and 6b etc. A number of the embodiments also employ the same rotary electrically conductive disc 3, hence wherever applicable the same reference numerals as used in connection with the prior art are used throughout drawings 3 to 8 to denote like parts.

Figure 3:
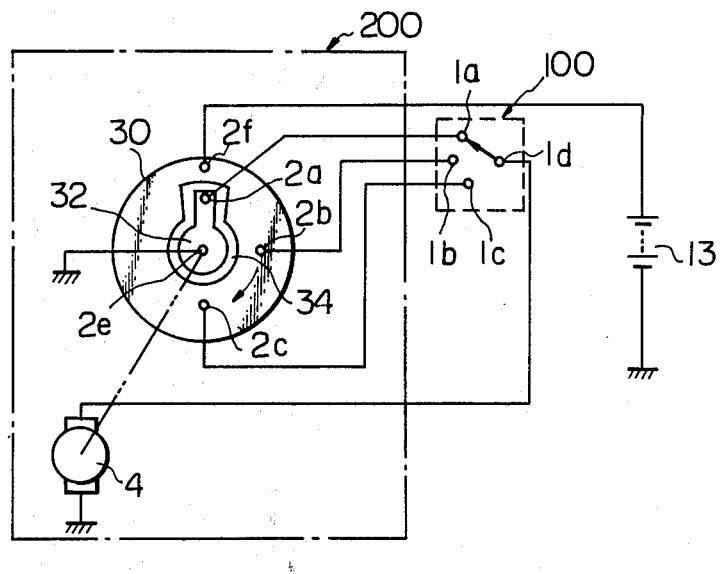
FIG. 3, is a schematic drawing of the first embodiment of a control system according to the present invention.

Turning now to FIG. 3, wherein the first embodiment of the present invention is illustrated, it will be noted that the electrically conductive disc takes on a different configuration and is denoted by 30. As before the disc is made of an electrically conductive material. Disposed at a substantially central portion of the disc 30 is a second conductive member 32 insulated from the main body of the disc 30 by a suitable insulator 34. The second conductive member is connected to earth as shown via a contact 2e. In this arrangement the sliding contacts 2a to 2c are arranged to normally slide on the surface of the disc 30 and sequentially ride onto the second conductive member 32. Another electrode 2f is provided and located near the periphery of the disc 30 so as not to come into contact with the second conductive member 32 at any time. This contact is, as shown, connected directly to the battery 13.

Thus with this arrangement upon the driver operatable switch 100 being operated to connect a sliding contact in contact with the main disc 30 to the electric motor 4, current will pass from the battery through the disc 30, selected sliding contact, stationary contact and contacting movable contact 1d to the motor. Upon current passing to the motor 4 the disc 30 will be rotated as in the case of the prior art. The disc 30 will thus rotate until the selected sliding contact rides up onto the second conductive member 32. It will be noted that the amount of insulator 34 traversed by the sliding contacts is made as small as possible. The reason for this will become evident as the description proceeds. Upon having ridden up onto the second conductive member the sliding contact will be switched to ground via the connection of the second conductive member to earth. For the sake of explanation assume that the sliding contact 2a was initially in contact with the main disc 30 and the driver operatable switch was set so that the movable contact 1d was contacted with the stationary contact 1a and that current was fed to the motor 4. Further lets assume that the sliding contact 2a has now just ridden up onto the second conductive member 32. Now it will be noted that at the same instant the connection between the battery 13 and the motor 4 has been cut and the armature coil connected to earth at both ends thereof. An armature short thus achieved induces a counter EMF in the armature coil in turn inducing a braking effect which stops the rotation of the armature instantly. The motor thus cannot overrun to cause the selected sliding contact to once again move off the second conductive member and the desired position.

Figure 4:
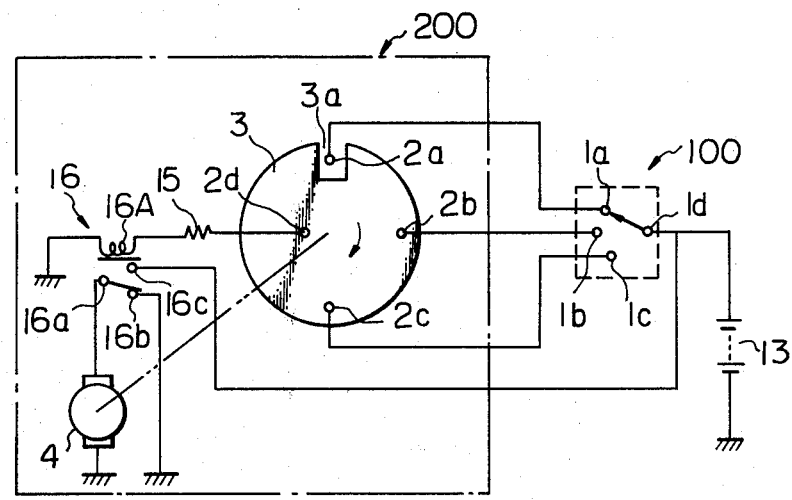
FIGS. 4 to 8 illustrate second to sixth embodiments of the present invention.

Turning now to FIG. 4, we find an arrangement constituting the second embodiment of the present invention. In this arrangement the rotary electrically conductive member is the same as that employed in the prior discussed prior art. This arrangement differs in that a relay switch generally denoted by the numeral 16 is connected to the disc 3 though a sliding contact 2d. As before the sliding contacts 2a to 2c are arranged in positions in which they will come successively or sequentially into contact with a nonconductive portion of the disc. It is to be noted that the nonconductive portion can take the form of a recess as per the prior art or take the form of a piece of insulator set into the surface of the disc.

The relay switch 16, as conventional has a coil 16A a contact 16a, which is connected to the motor 4, an NC contact (normally closed contact) 16b and an NO contact (normally open contact) 16c. The latter contact 16c is connected as shown directly to the battery 13. An armature member (no numeral) is arranged to connect the contact 16a and the NO contact 16c when the coil 16A is energized and connect the contact 16a and the NC contact 16b when the coil 16A is not energized. Thus when the coil is energized the armature member connects the contacts 16a and 16c so that current can flow between the battery 13 and the motor 4. However when the coil is deenergized the relay 16 connects the contact 16a and 16c short circuiting the armature.

Hence if the movable contact 1d of the driver operatable switch 100 is set to contact stationary contact 1b current will flow from said contact 1b to the sliding contact 2b, through the disc 3 to the sliding contact 2d, through a resistor 15 to the coil 16A and to earth. Current will flow from the battery to the motor 4 due to the energization of the coil 16A and the disc will rotate until the nonconductive portion 3a reaches the sliding contact 2b. At this time the flow of current through the coil 16A will cease and the relay switch will accordingly short circuit the armature to induce the afore mentioned braking effect. The motor will stop rotating and the disc 3 remain stationary ensuring that the sliding contact 2b does not come unwantedly into contact with the disc 3 once more.

This arrangement exhibits the feature that a relatively small amount of current passes through the contacts 1d, 1b, 2b and 2d as compared with the amount of current directed through the contacts 16c and 16a of the relay 16 to the electric motor 4. Hence the longevity of the sliding contacts is assured.

Figure 5:
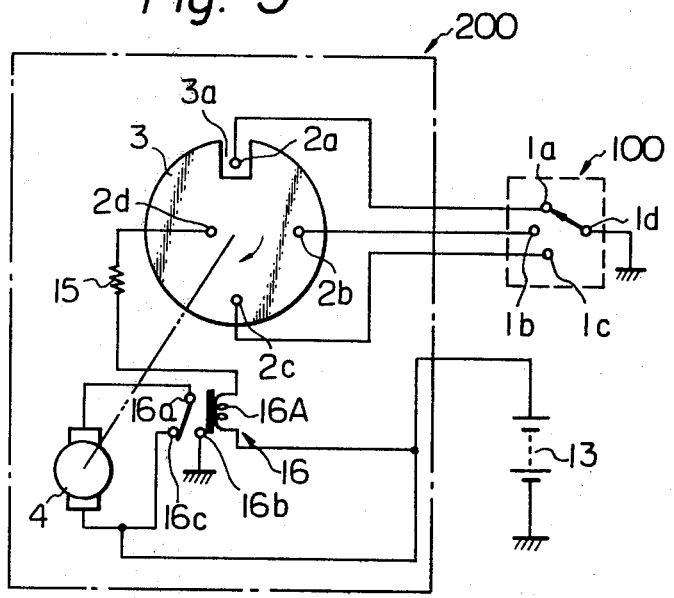

FIG. 5 shows a third embodiment of the present invention which is quite similar to the second but which features circuitry which will in the process of short circuiting the armature of the motor connect both terminals of the motor to the same terminal of the battery 13. In this embodiment the movable contact 1d of the driver operatable switch 100 is connected to earth and the battery connected as shown. Thus upon connection of one slidable contact which is in contact with the disc 3 current will flow through the coil 16A resistance 15 through the disc 3 contact 1d to earth. Upon this, the armature member of the relay will move to connect one of the terminal of the motor 4 to earth while the other remains in contact with the battery 13. The motor will be energized until the nonconductive portion 3a reaches the contact which corresponds to that in the driver operatable switch 100 which is contacted with the movable switch 1d. At this time the motor 4 will have both terminals of the armature coils reconnected to the same terminal of the battery (in this case the positive terminal).

The operation of this embodiment is quite the same as the second embodiment but features the advantage that the switch 100 need not be connected to the battery 13.

Figure 6:
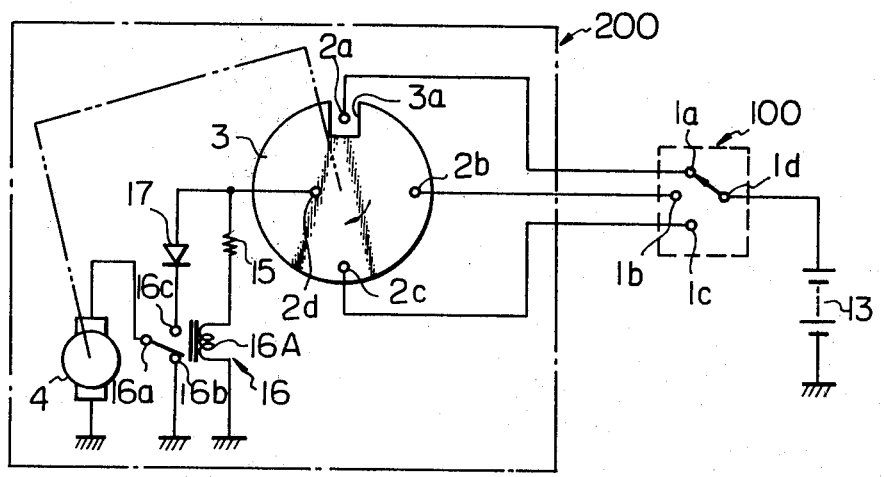

FIG. 6 shows a fourth embodiment of the present invention. In this arrangement all of the current from the battery 13 is arranged to flow though the switch 100 and is characterized in that a diode 17 is interposed between the NO contact 16c of the relay 16 and the battery 13. The diode serves to prevent any current produced by the counter electromotive force produced immediately after the relay coil short circuits the motor 4, from flowing back through the resistor 15 and the coil 16A, reenergizing the coil to reinduce operation of the motor 4.

Figure 7:
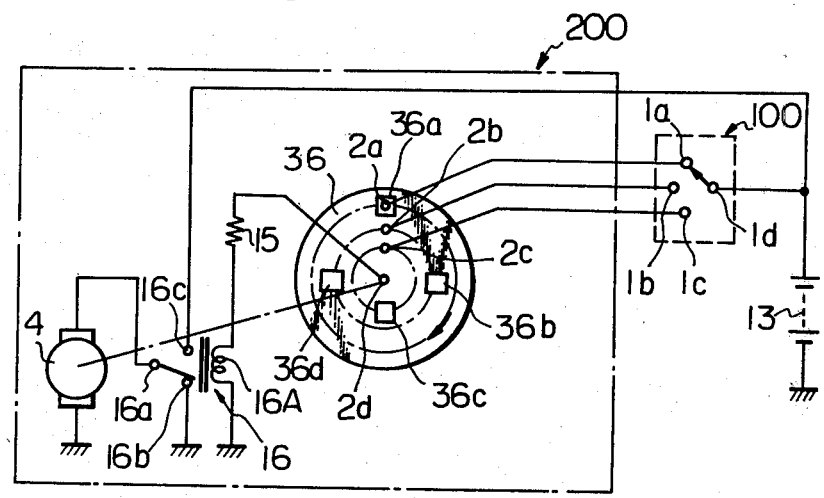

Coming now to the fifth embodiment of the invention which is illustrated in FIG. 7 of the drawings the rotary electrically conductive member takes the form of a disc 36 provided with a plurality of nonconductive portions. In the illustrated example there are four nonconductive portions provided in the surface of the disc 36, namely 36a, 36b, 36c and 36d. As shown the nonconductive portions 36a, 36b and 36c are spaced about disc 36 (in this case in circumferential positions differing by 90 degrees) each at a different radius from the axis of rotation of the disc 36. The fourth nonconductive portion 36d is arranged at the same radius from the axis of rotation of the disc as the nonconductive portion 36b and arranged diametrically opposite thereto.

The sliding contacts 2a to 2c are each arranged a different radius so as to be respectively contactable with the nonconductive portions 36a, 36b and 36c. Now it is to be noted that the contact 2b will contact two nonconductive portions per revolution of the disc, namely portions 36b and 36d. The contacts may be arranged as shown in the drawings along the same radial line. The sliding contact 2d is again arranged not to come into contact with any of the nonconductive portions at any time.

The operation of this embodiment is basically the same as that of the second embodiment shown in FIG. 4, with the notable exception that with this arrangement the movement of the headlight mounting frames can be varied to direct the headlight beams along the axes Ao-Bo-Co-Bo-Ao- as compared with the previous arrangement wherein the sequence was limited to Ao-Bo-Co-Ao (of course the sequences would undergo changes upon the provision of four or more axes instead of the illustrated three, as will be readily understood).

Figure 8:
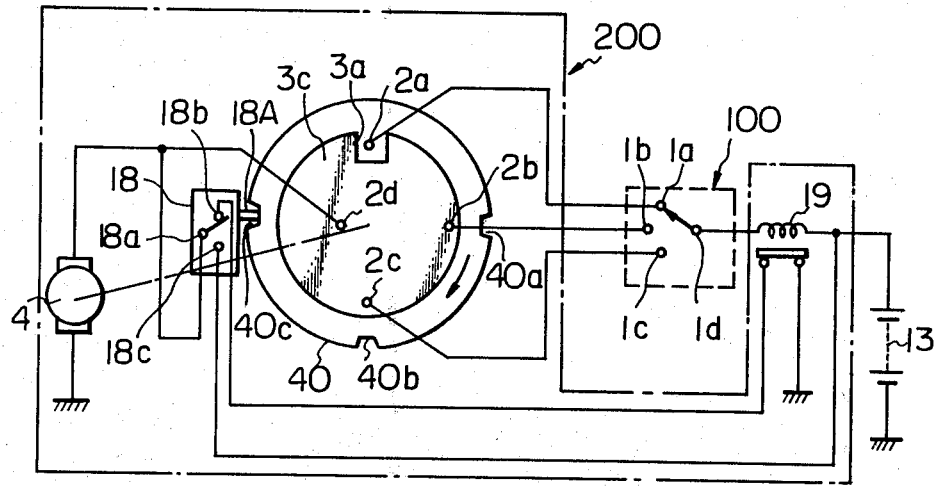

In the sixth embodiment of the present invention shown in FIG. 8, a micro switch is included in the circuitry. In this case the disc 3 is formed with a plurality of cam surfaces separated by or defining a plurality of recesses 40a, 40b and 40c. These recesses can be formed in the disc 3 or in a member 40 fixedly connected to the disc for synchronous rotation therewith. As shown the micro switch 19 is provided with a NC contact 18b and a NO contact 18c. Thus when a feeler button 18A rides along the surfaces defined between the recesses the switch 18 connects contacts 18a and 18c (NO contact). At this time current may flow from the battery through the switch 18 to the motor 4. A relay switch 19 is provided wherein the coil thereof is connected in series between the battery 13 and the manually operable switch 100. This relay switch 19 is arranged to be normally closed to connect the NO contact 18c of the micro switch to earth and to disconnect said contact 18c and the earth while current flows through the coil.

Thus with this arrangement when the movable contact 1d is moved to, for example, stationary contact 1b electric current will flow through the coil of the relay so that the NO contact 18c of the micro switch 18 is no longer grounded removing the short circuit provided across the terminals of the armature of the electric motor 4. As in the previously described embodiments electric current is fed to the motor 4 which rotates the disc 3 until such time as the recess or nonconducting portion 3a reaches the sliding contact 2b. At this time the coil of the relay switch 19 will be deenergized re-establishing the connection between ground and the NO contact 18c. Thus upon the feeler button 18A of the micro switch 18 projecting into a recess the motor 4 will be short circuited to induce the afore mentioned braking effect.

It will be appreciated that since the operation of the micro switch 18 is not directly dependent on a signal indicative of the breaking of the circuit between the battery and the motor 4 substantial adjustment can be effected by adjustment of the position of the micro switch 18 with respect to the disc 3 and/or the relation ship between the recesses 40a to 40c with respect to the nonconductive portion 3a. Other means of effecting adjustment may take the form of arranging the recesses to be defined by adjustable means so that the size and or position with respect to each other can be varied. Yet further methods of adjusting will be readily apparent to those skilled in the art.

It will be also obvious that the present invention is not limited to the illustrated and described arrangement and can undergo various changes such as the use of a cylindrical member in place of the disc members 3, 30 and 36.

What is claimed is:

1. In a headlight tilting system for a vehicle, said system having at least one headlight mounting frame pivotally mounted to the body of said vehicle,
    a source of electromotive force (E.M.F)
    an electric motor said motor having first and second terminals;
    a rotary shaft in drive connection with said motor;
    linkage means operatively interconnecting said rotary shaft and said frame for causing said frame to oscillate in response to the rotation of said motor; and
    circuit means for selectively connecting said motor to said source so that said frame is caused to oscillate and for disconnecting said motor from said source and simultaneously short circuiting said motor, including
    a member mounted to said rotary shaft for synchronous rotation therewith, said member having a first electrically conductive portion and at least one second portion electrically isolated from said first portion;
    a plurality of sliding contacts which slide on said member, a first group of said sliding contacts being arranged to slide only on said first portion and a second group which each cyclically slide on said first and second portions in a manner that only one of said second group slides on said second portion at one time;
    a manually operatable switch having a plurality of stationary contacts each connected to one of said second group and a movable contact which can be set to contact a stationary contact which corresponds to one of said second group in contact with said first portion so that electric current flows between said one of said second group and said first group and that said motor rotates said member until said second portion comes into contact with said one of said second group whereupon said source is disconnected from said motor; and
    switching means for short circuiting said motor upon said member rotating to the position in which said second portion comes into contact with said one of said second group.

2. A headlight tilting system as claimed in claim 1, wherein said switching means takes the form of said second portion of said member, said second portion being electrically conductive and so circuited that upon said one of said second group of sliding electrodes sliding on said second portion both of said terminals of said motor are electrically connected to short circuit said motor.

3. A headlight tilting system as claimed in claim 1, in which said switching means takes the form of a relay switch having a coil, said relay switch being so constructed and arranged that said coil is energized upon electric current flowing between said first and second group of sliding contacts, said relay switch establishing a circuit between said source and said motor when said coil is energized and connecting said first and second terminals of said motor when said coil is deenergized to short circuit said motor.

4. A headlight tilting system as claimed in claim 1, wherein said switching means takes the form of:
    a micro switch having a feeler button; and
    means defining a plurality of cam surfaces on said member for camming said feeler button between a first position in which it establishes a circuit between said motor and said source and a second position in which it connects said first and second terminals of said motor to short circuit said motor.

5. A headlight tilting system as claimed in claim 1, wherein said at least one second portion takes the form of a recess formed in the surface of said member.

6. A headlight tilting system as claimed in claim 1, wherein said at least one second portion takes the form of a piece of insulator disposed on the surface of said member.

7. A headlight tilting system as claimed in claim 1, wherein said at least one second portion takes the form of a plurality of non conducting portions disposed on said member, said plurality of non-conducting portions and said second group of sliding contacts being arranged so that one of said second group of sliding contacts slides exclusively on two of said non conductive portions while the remaining sliding contacts of said second group slide exclusively on one of said non conductive portions.

8. A headlight tilting system as claimed in claim 1, wherein said second member takes the form of a second electrically conductive member which is constantly connected to earth.

9. A headlight tilting system as claimed in claim 4, wherein said switching means further comprises a relay switch so circuited that when electric current flows between said one of said second group of sliding contacts and said first group of sliding contacts the coil of the relay switch is energized to prevent said connection between said first and second terminals of said motor when said feeler button of said micro switch assumes said second position thereof.

* * * * *